(12) United States Patent
Clediere

(10) Patent No.: US 10,984,183 B1
(45) Date of Patent: Apr. 20, 2021

(54) SYSTEMS AND METHODS FOR SHARING CONTENT

(71) Applicant: Facebook, Inc., Menlo Park, CA (US)

(72) Inventor: Robin Maxime Clediere, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/143,065

(22) Filed: Sep. 26, 2018

(51) Int. Cl.
*G06F 17/00* (2019.01)
*G06F 40/169* (2020.01)
*H04L 12/58* (2006.01)
*H04L 29/06* (2006.01)
*G06F 3/0482* (2013.01)

(52) U.S. Cl.
CPC .......... *G06F 40/169* (2020.01); *G06F 3/0482* (2013.01); *H04L 51/32* (2013.01); *H04L 65/403* (2013.01)

(58) Field of Classification Search
CPC .... G06F 17/241; G06F 3/0482; G06F 40/169; H04L 51/32; H04L 65/403
See application file for complete search history.

(56) References Cited

U.S. PATENT DOCUMENTS

| | | | |
|---|---|---|---|
| 9,230,014 B1 * | 1/2016 | Peintner | H04L 51/32 |
| 9,275,684 B2 * | 3/2016 | Amento | G06F 3/04883 |
| 9,438,691 B1 * | 9/2016 | Andrews | H04L 67/306 |
| 9,660,951 B1 * | 5/2017 | Tunguz-Zawislak | H04N 21/00 |
| 9,760,547 B1 * | 9/2017 | Brougher | G06Q 10/063 |
| 9,798,832 B1 * | 10/2017 | Lessin | G06F 16/242 |
| 9,817,805 B1 * | 11/2017 | Markman | G06Q 10/10 |
| 10,126,927 B1 * | 11/2018 | Fieldman | G06F 3/04847 |
| 10,223,438 B1 * | 3/2019 | Xu | G06F 16/285 |
| 10,248,931 B2 * | 4/2019 | Amento | G06F 16/00 |
| 10,304,079 B2 * | 5/2019 | Znerold | G06Q 30/0242 |
| 10,572,135 B1 * | 2/2020 | Fieldman | G06F 3/0488 |
| 2009/0094039 A1 * | 4/2009 | MacDonald | G06Q 10/06 705/300 |
| 2010/0151431 A1 * | 6/2010 | Miller | G09B 5/00 434/350 |
| 2010/0318922 A1 * | 12/2010 | Strathearn | G06F 16/345 715/751 |
| 2012/0210247 A1 * | 8/2012 | Khouri | G06Q 10/101 715/751 |
| 2013/0103686 A1 * | 4/2013 | Sisneros | G06F 9/44526 707/736 |
| 2013/0166649 A1 * | 6/2013 | Atzmon | H04L 67/22 709/204 |
| 2013/0185657 A1 * | 7/2013 | Gunawardena | G06F 40/169 715/753 |

(Continued)

*Primary Examiner* — Laurie A Ries
(74) *Attorney, Agent, or Firm* — Sheppard Mullin Richter & Hampton LLP

(57) ABSTRACT

Systems, methods, and non-transitory computer-readable media can determine a request to create a collaborative post, the request having been submitted by a first user of a social networking system. A determination can be made of at least one second user of the social networking system that was identified as a collaborating user, wherein the at least one second user is permitted to contribute to the collaborative post. The collaborative post can be generated based at least in part on content provided by the first user and the at least one second user. The collaborative post can be published through the social networking system.

20 Claims, 13 Drawing Sheets

(56) References Cited

U.S. PATENT DOCUMENTS

| | | | | |
|---|---|---|---|---|
| 2013/0260354 | A1* | 10/2013 | Kutty | G09B 5/00 434/350 |
| 2013/0339443 | A1* | 12/2013 | Goldman | H04L 65/403 709/204 |
| 2014/0237056 | A1* | 8/2014 | Smalley | H04L 51/32 709/206 |
| 2014/0249912 | A1* | 9/2014 | Znerold | G06Q 30/0242 705/14.41 |
| 2014/0250023 | A1* | 9/2014 | Forbes | G06Q 30/02 705/319 |
| 2014/0344715 | A1* | 11/2014 | Beerse | G06Q 10/109 715/753 |
| 2014/0372253 | A1* | 12/2014 | Arunachalam | G06Q 30/0623 705/26.61 |
| 2015/0012448 | A1* | 1/2015 | Bleiweiss | G06Q 50/18 705/311 |
| 2015/0052427 | A1* | 2/2015 | Vagell | G06F 40/166 715/256 |
| 2015/0100892 | A1* | 4/2015 | Cronin | G06Q 10/06 715/747 |
| 2015/0331578 | A1* | 11/2015 | Keslin | G06F 3/04817 715/751 |
| 2015/0370769 | A1* | 12/2015 | Pereira Filho | G06F 21/6209 726/28 |
| 2016/0094536 | A1* | 3/2016 | Krueger | H04L 63/083 726/4 |
| 2016/0149843 | A1* | 5/2016 | Spicer | H04L 51/32 709/206 |
| 2016/0154974 | A1* | 6/2016 | Kisnisci | G06F 16/9535 726/28 |
| 2016/0189077 | A1* | 6/2016 | Azmoon | G06Q 10/06316 705/7.26 |
| 2017/0052926 | A1* | 2/2017 | Viveiros | G06F 40/106 |
| 2017/0139890 | A1* | 5/2017 | Bendig | G06F 16/951 |
| 2017/0235536 | A1* | 8/2017 | Chang | G06F 3/1454 715/753 |
| 2018/0113587 | A1* | 4/2018 | Allen | G06T 13/80 |
| 2019/0132393 | A1* | 5/2019 | Ring | H04L 67/02 |
| 2019/0147549 | A1* | 5/2019 | Tang | G06Q 50/01 705/319 |
| 2019/0171338 | A1* | 6/2019 | Voss | H04L 65/403 |
| 2019/0244222 | A1* | 8/2019 | Rathod | G06F 16/58 |
| 2019/0279522 | A1* | 9/2019 | Jafari | G09B 5/08 |
| 2019/0370544 | A1* | 12/2019 | Wright, Jr. | G06F 3/011 |

\* cited by examiner

US 10,984,183 B1

SYSTEMS AND METHODS FOR SHARING CONTENT

FIELD OF THE INVENTION

The present technology relates to the field of content sharing. More particularly, the present technology relates to techniques for users to share content.

BACKGROUND

Users often utilize computing devices for a wide variety of purposes. Users can use their computing devices to, for example, interact with one another, access content, share content, and create content. In some cases, content can be provided by members of a social network. The content can include one or a combination of text, images, videos, and audio. The content may be published to the social network for consumption by others.

SUMMARY

Various embodiments of the present disclosure can include systems, methods, and non-transitory computer readable media configured to determine a request to create a collaborative post, the request having been submitted by a first user of a social networking system. A determination can be made of at least one second user of the social networking system that was identified as a collaborating user, wherein the at least one second user is permitted to contribute to the collaborative post. The collaborative post can be generated based at least in part on content provided by the first user and the at least one second user. The collaborative post can be published through the social networking system.

In an embodiment, the collaborative post includes one or more cards, each card being created by the first user or the at least one second user.

In an embodiment, each card includes text, visual content, or a combination thereof.

In an embodiment, generating the collaborative post includes determining at least one first card that was created by the first user for publication with the collaborative post and associating the at least one first card with the collaborative post.

In an embodiment, the systems, methods, and non-transitory computer readable media are further configured to determine one or more edits made to the at least one first card by the at least one second user and apply the one or more edits to the at least one first card, wherein the one or more edits are reflected in the published collaborative post.

In an embodiment, the one or more edits include at least one annotation added to the at least one first card by the at least one second user.

In an embodiment, the at least one annotation includes text and an avatar representing the at least one second user.

In an embodiment, generating the collaborative post includes determining at least one second card that was created by the at least one second user for publication with the collaborative post and associating the at least one second card with the collaborative post.

In an embodiment, the systems, methods, and non-transitory computer readable media are further configured to determine that the at least one second card was created after publication of the collaborative post and update the published collaborative post to include the at least one second card.

In an embodiment, the at least one second user is permitted to add content to the collaborative post even after the collaborative post is published to the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
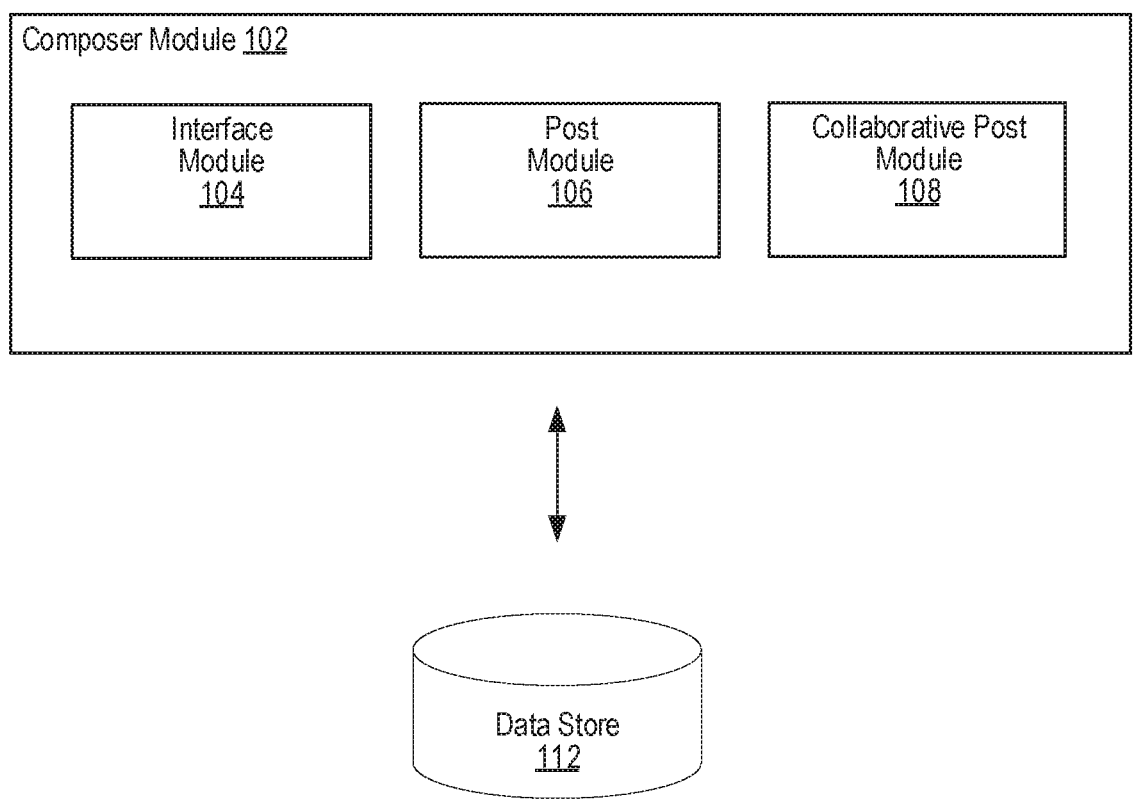
FIG. 1 illustrates an example system including an example composer module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

As mentioned, users often utilize computing devices for a wide variety of purposes. Users can use their computing devices to, for example, interact with one another, access content, share content, and create content. In some cases, content can be provided by members of a social network. The content can include one or a combination of text, images, videos, and audio. The content may be published to the social network for consumption by others.

Under conventional approaches, users can confront various challenges when composing content to be shared through a content provider (e.g., a social networking system). In general, users of a social networking system may compose posts to be shared with other users through the social networking system. For example, users can typically compose such posts using a composer interface that includes a content field and a virtual keyboard. A user accessing the composer interface can create a post by entering information such as text or emojis using the virtual keyboard. The entered information can then be reflected in the content field. Once satisfied with the post, the user can select an option to share (or publish) the post through the social networking system. Such conventional approaches are generally unable to accommodate multiple users that seek to jointly compose a collaborative post. For example, under conventional approaches, multiple users that attended the same event would individually compose and share their own posts about the event. These posts may then be published separately to one or more content feeds for consumption. However, there may be instances where a single collaborative post that includes contributions from the multiple users is preferred. Accordingly, under conventional approaches, the user experience can suffer, thereby discouraging users from sharing content through the social networking system.

An improved approach rooted in computer technology overcomes the foregoing and other disadvantages associated with conventional approaches specifically arising in the realm of computer technology. In various embodiments, a composer interface for creating and sharing collaborative posts can be provided. In various embodiments, a collaborative post can include one or more cards that are created by one or more collaborating users. Each card can include content such as text, visual content (e.g., images, videos, stickers, etc.), audio content, or a combination thereof. Further, in some embodiments, collaborating users are permitted to interact with cards included in the collaborative post. For example, a second collaborating user can annotate a card that was created by a first collaborating user. In some embodiments, collaborating users can continue to update the collaborative post even after its publication through a social networking system. For example, collaborating users can continue adding new cards to the collaborative post or editing existing cards in the collaborative post after its publication. In this example, the published collaborative post can be updated as additional cards or edits to the collaborative post are submitted. More details relating to the disclosed technology are provided below.

FIG. 1 illustrates an example system 100 including an example composer module 102, according to an embodiment of the present disclosure. As shown in the example of FIG. 1, the composer module 102 can include an interface module 104, a post module 106, and a collaborative post module 108. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the composer module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the composer module 102 or at least a portion thereof can be implemented using one or more computing devices or systems that include one or more servers, such as network servers or cloud servers. In some instances, the composer module 102 can, in part or in whole, be implemented within or configured to operate in conjunction with a social networking system (or service), such as the social networking system 630 of FIG. 6. In some instances, the composer module 102 can be, in part or in whole, implemented within or configured to operate in conjunction or be integrated with a client computing device, such as the user device 610 of FIG. 6. For example, the composer module 102 can be implemented as or within a dedicated application (e.g., app), a program, or an applet running on a user computing device or client computing system. The application incorporating or implementing instructions for performing some, or all, functionality of the composer module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The composer module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In various embodiments, the interface module 104 can be configured to provide a composer interface. The composer interface can provide options for composing and sharing posts. In general, the composer interface may be presented through a display screen of a computing device. A user operating the computing device can interact with the composer interface using various touchscreen gestures or an external apparatus, for example. In some embodiments, the composer interface can include a content field, a virtual keyboard, and options for creating and sharing posts. For example, the composer interface can provide options for composing and sharing posts that are authored by a single user. In various embodiments, the composer interface can provide options for composing and sharing collaborative posts that are authored by two or more collaborating users. More details regarding the composer interface will be provided below with reference to FIGS. 3A-3F.

The post module 106 can be configured to provide options for composing and sharing posts (or content items) that are authored by a single user. These posts can include text, visual content (e.g., images, videos, graphical text, animated text, etc.), audio content, or a combination thereof. Further, such posts can be published in one or more content feeds that are accessible over a social networking system.

The collaborative post module 108 can be configured to provide options for composing and sharing collaborative posts (or collaborative content items) that are authored by two or more collaborating users. In some embodiments, a collaborative post can be composed of one or more cards. Further, each card can be created by a collaborating user and may include text, visual content (e.g., images, videos, graphical text, animated text, etc.), audio content, or a combination thereof. More details regarding the collaborative post module 108 will be provided below with reference to FIG. 2.

Figure 2:
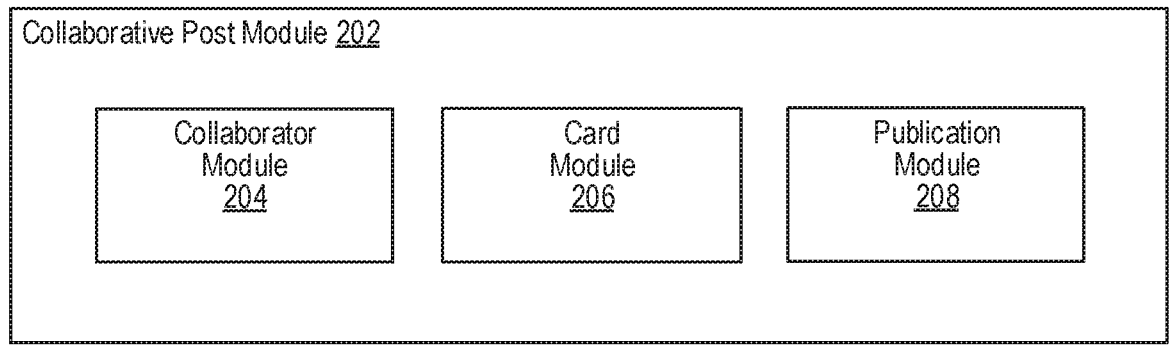
FIG. 2 illustrates an example collaborative post module, according to an embodiment of the present disclosure.

FIG. 2 illustrates an example collaborative post module 202, according to an embodiment of the present disclosure. The collaborative post module 202 can provide options for composing and sharing collaborative posts, for example, through a social networking system. In some embodiments, the collaborative post module 108 of FIG. 1 can be implemented with the collaborative post module 202. As shown in the example of FIG. 2, the collaborative post module 202 can include a collaborator module 204, a card module 206, and a publication module 208.

The collaborator module 204 can provide options for identifying users that can contribute to a collaborative post. In some embodiments, a user can select an option to create a collaborative post with one or more other specified users. For example, the user can tag one or more other collaborating users that may want to contribute to the collaborative post. In some embodiments, the collaborator module 204 can send notifications to the tagged users to inform them of the collaborative post. The tagged users can then access a composer interface to create content that can be published with the collaborative post.

The card module 206 can provide collaborating users with options for contributing to a collaborative post. For example, in some embodiments, the card module 206 can provide an option to create cards that can be included with the collaborative post. In some embodiments, each card can be composed of text, visual content (e.g., images, videos, graphical text, animated text, etc.), audio content, or a combination thereof. For example, a first collaborating user can create a card that includes images taken at a company event. Similarly, a second collaborating user can create a different card that includes text and videos of the company event. In various embodiments, collaborating users can create and add cards to the collaborative post in parallel. Once created, each card can be published with the collaborative post, for example, through a social networking system (e.g., social networking system 630 of FIG. 6). In various embodiments, users of the social networking system can access the collaborative post to view and comment on the collaborative post and/or cards published with the collaborative post. In some embodiments, the card module 206 can provide an option to interact with cards that have been published with the collaborative post. For example, a second collaborating user can add new content to a card that was created by a first collaborating user. In some embodiments, such interactions may involve adding annotations or other visual content to a card.

The publication module 208 can provide options for publishing collaborative posts. In various embodiments, the publication module 208 provides an option for publishing a collaborative post to a social networking system (e.g., social networking system 630 of FIG. 6). For example, a user that initially created a collaborative post can select this option to publish the collaborative post to the social networking system. There may be instances where a user publishes a collaborative post before other collaborating users have published their content for the collaborative post. For instance, a collaborative post may be published before collaborating users have submitted their cards for publication with the collaborative post. In another example, a collaborative post may be published before collaborating users have submitted their edits (e.g., annotations) to cards published with the collaborative post. In various embodiments, to accommodate such asynchronized publication of content, the publication module 208 permits collaborating users to publish their cards and edits to a collaborative post even after its publication. In such embodiments, the publication module 208 can continually update the collaborative post as collaborating users submit cards and edits for publication with the collaborative post. These continuous updates may be performed in real-time or near real-time.

Figure 3A:
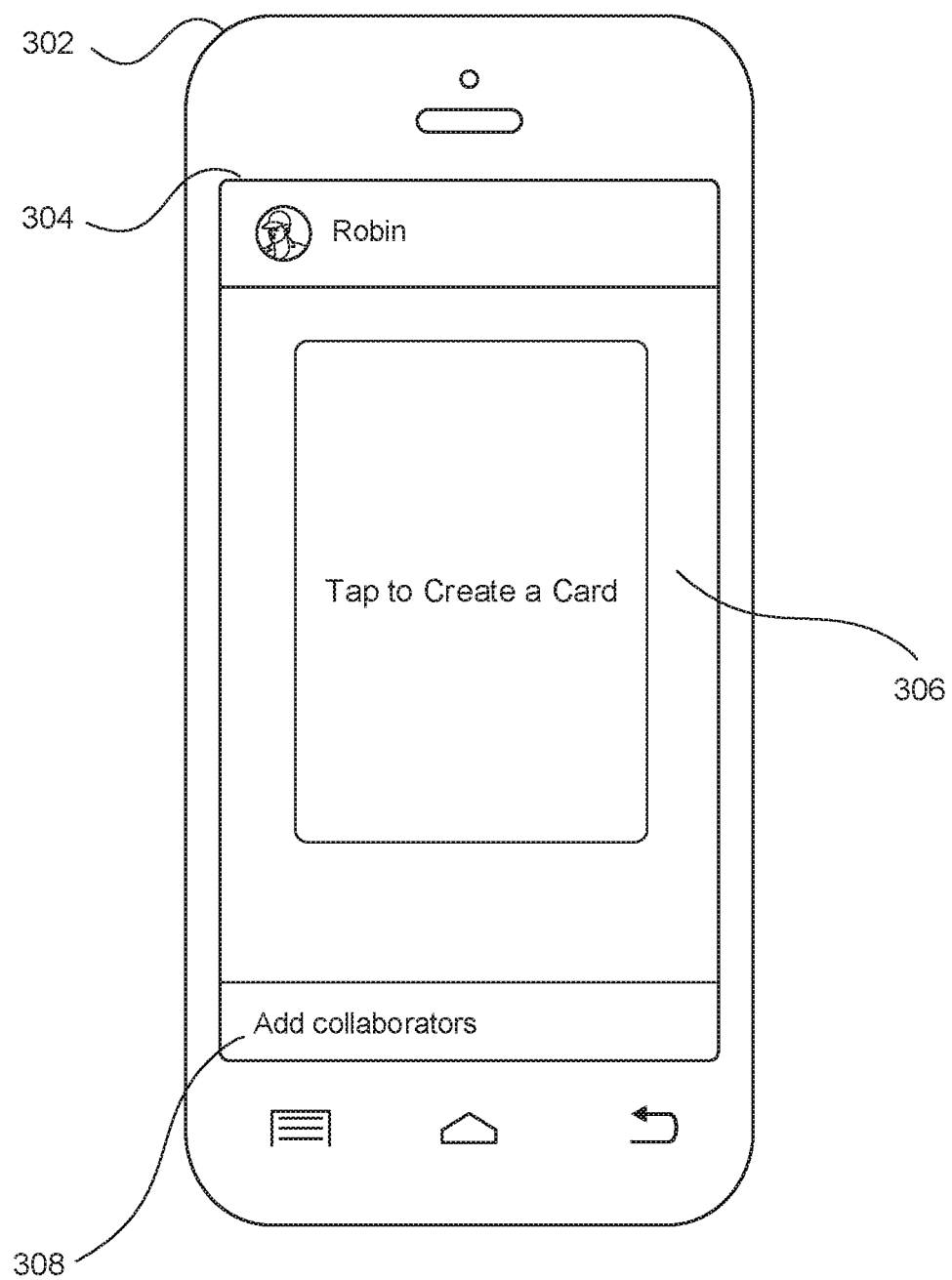
FIGS. 3A-3F illustrate an example interface, according to an embodiment of the present disclosure.
Figure 3B:
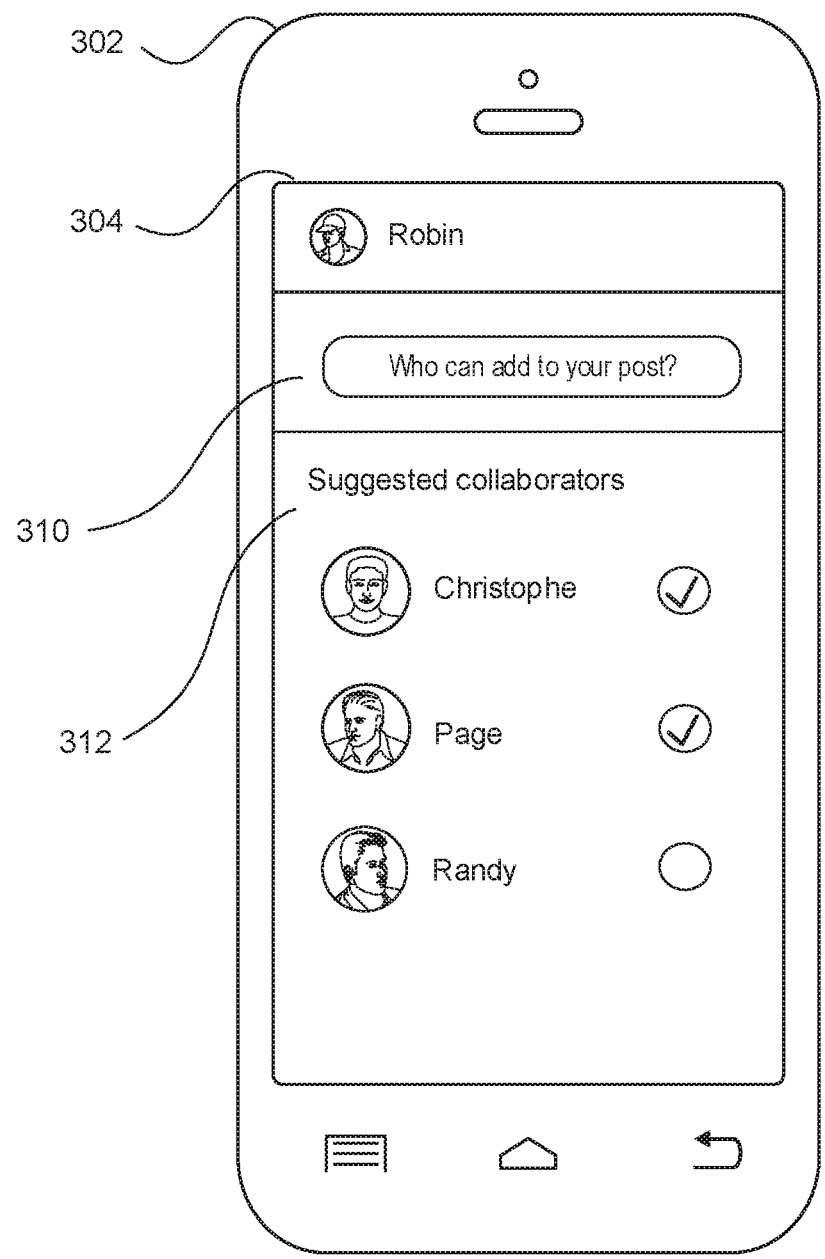
Figure 3C:
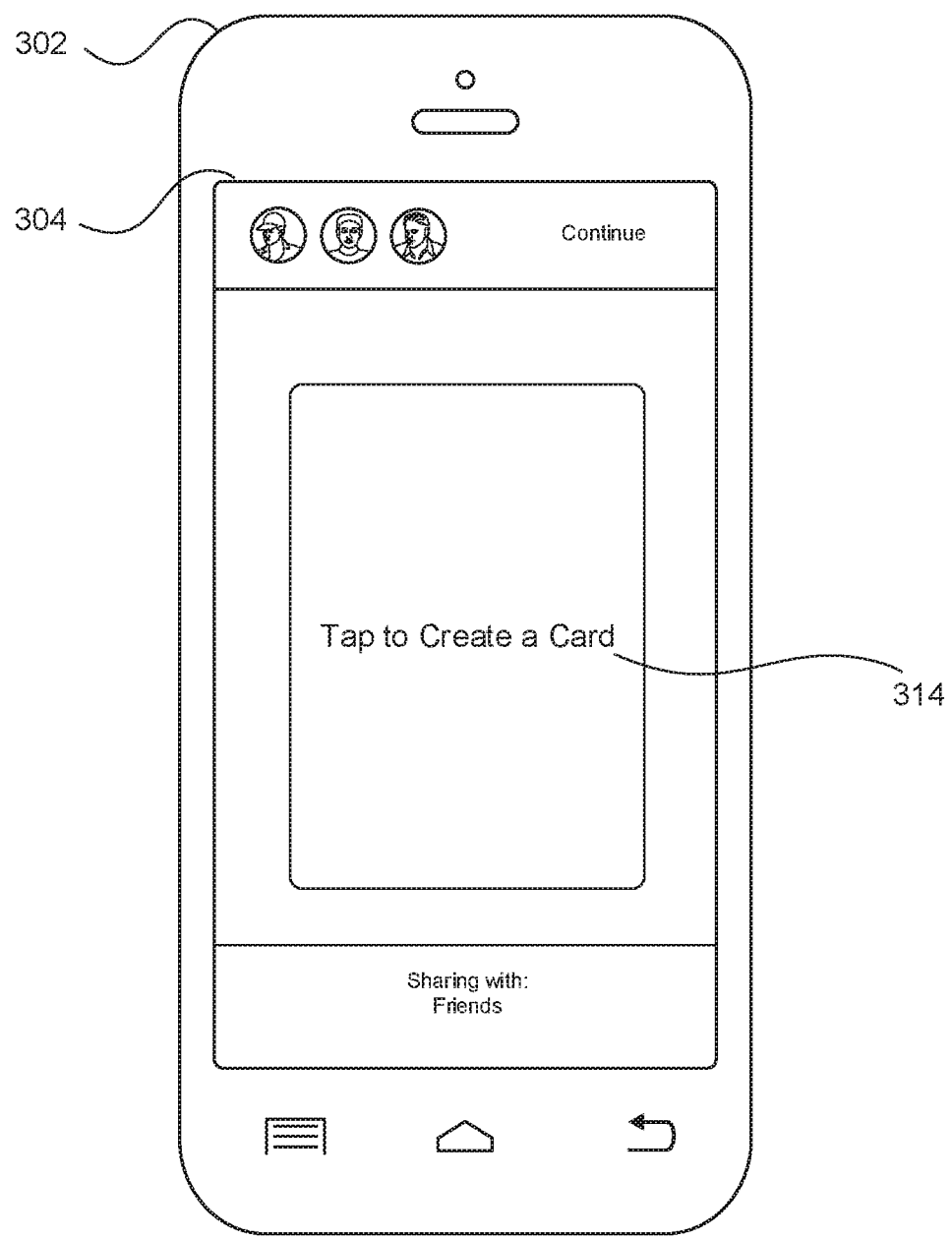
Figure 3D:
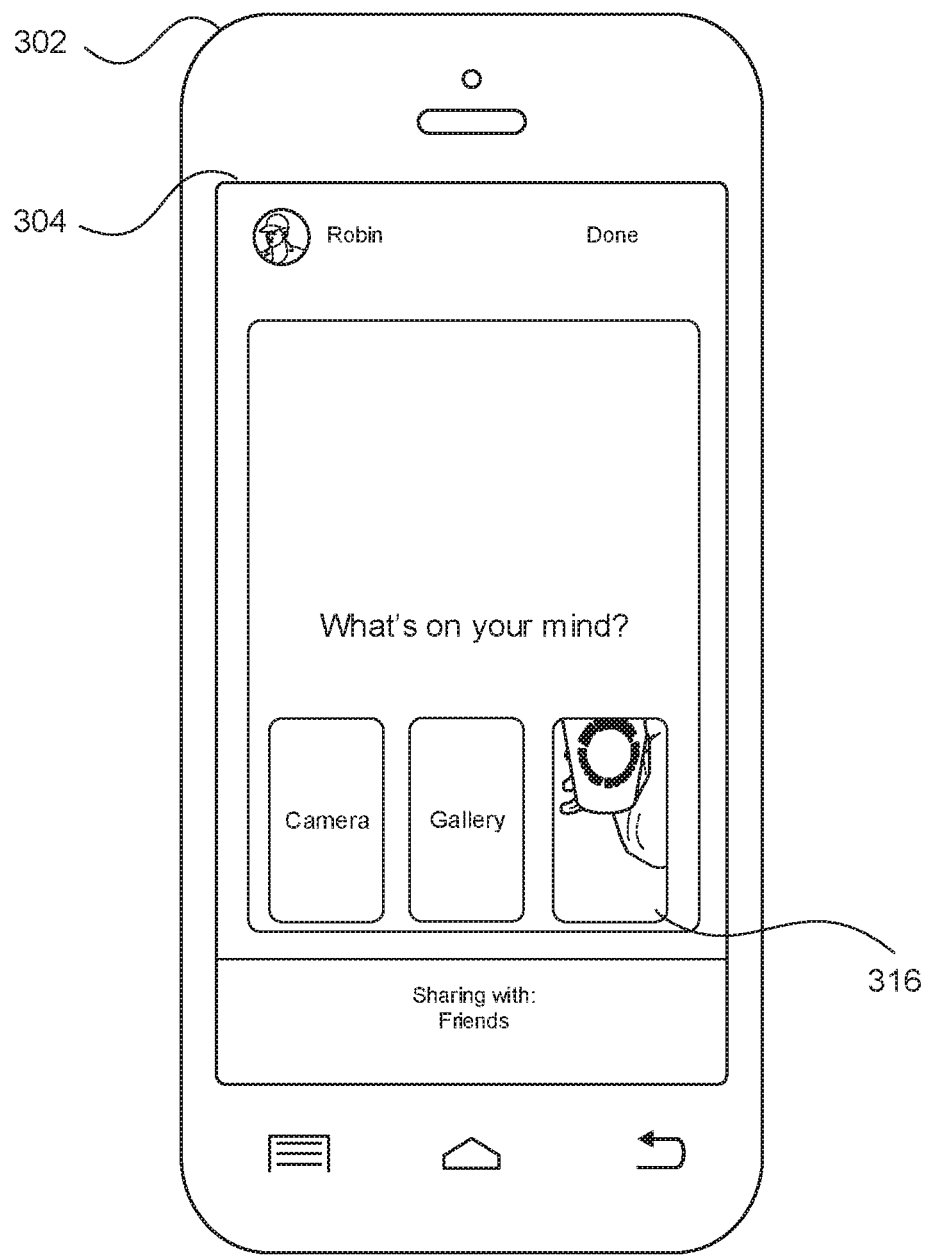
Figure 3E:
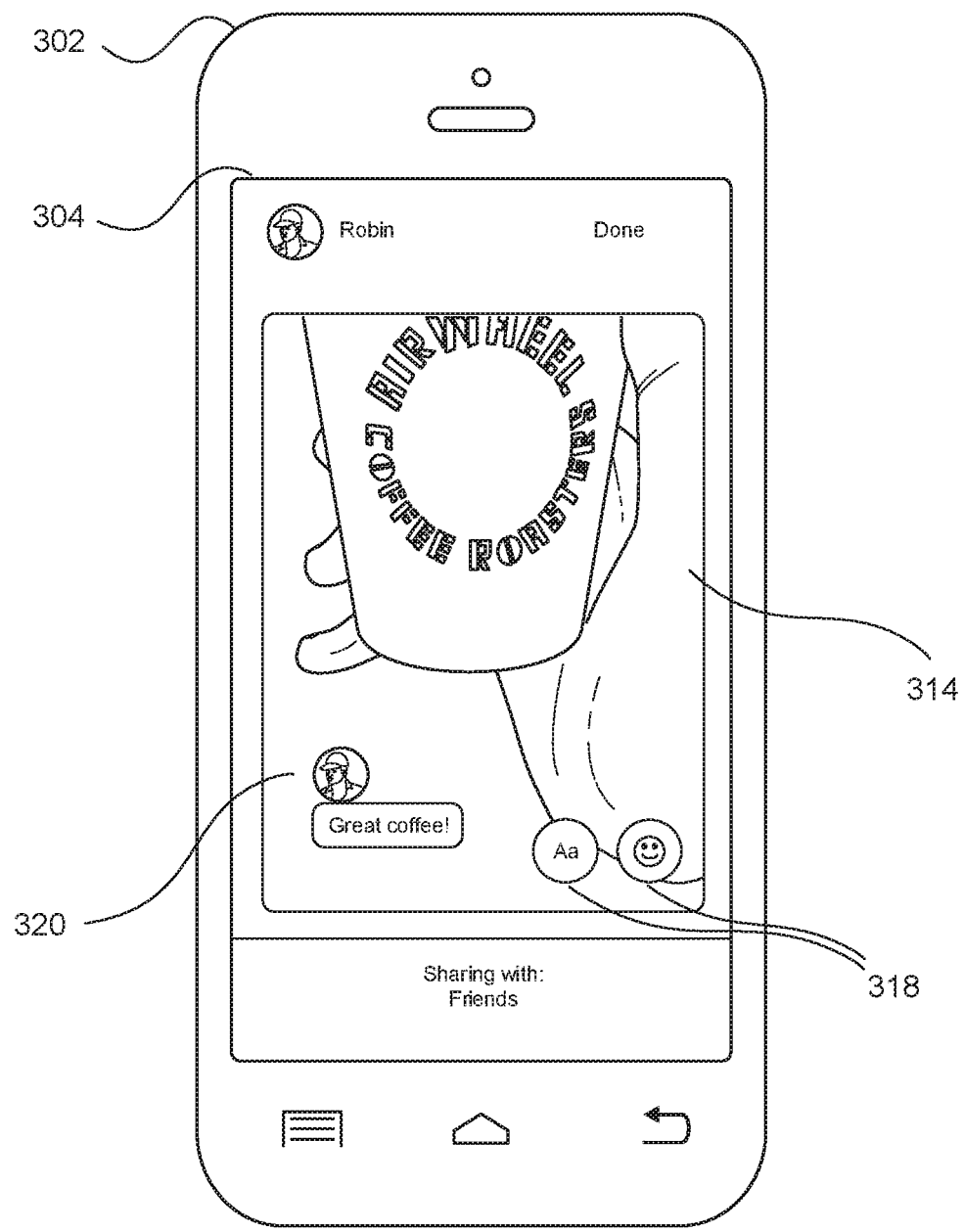
Figure 3F:
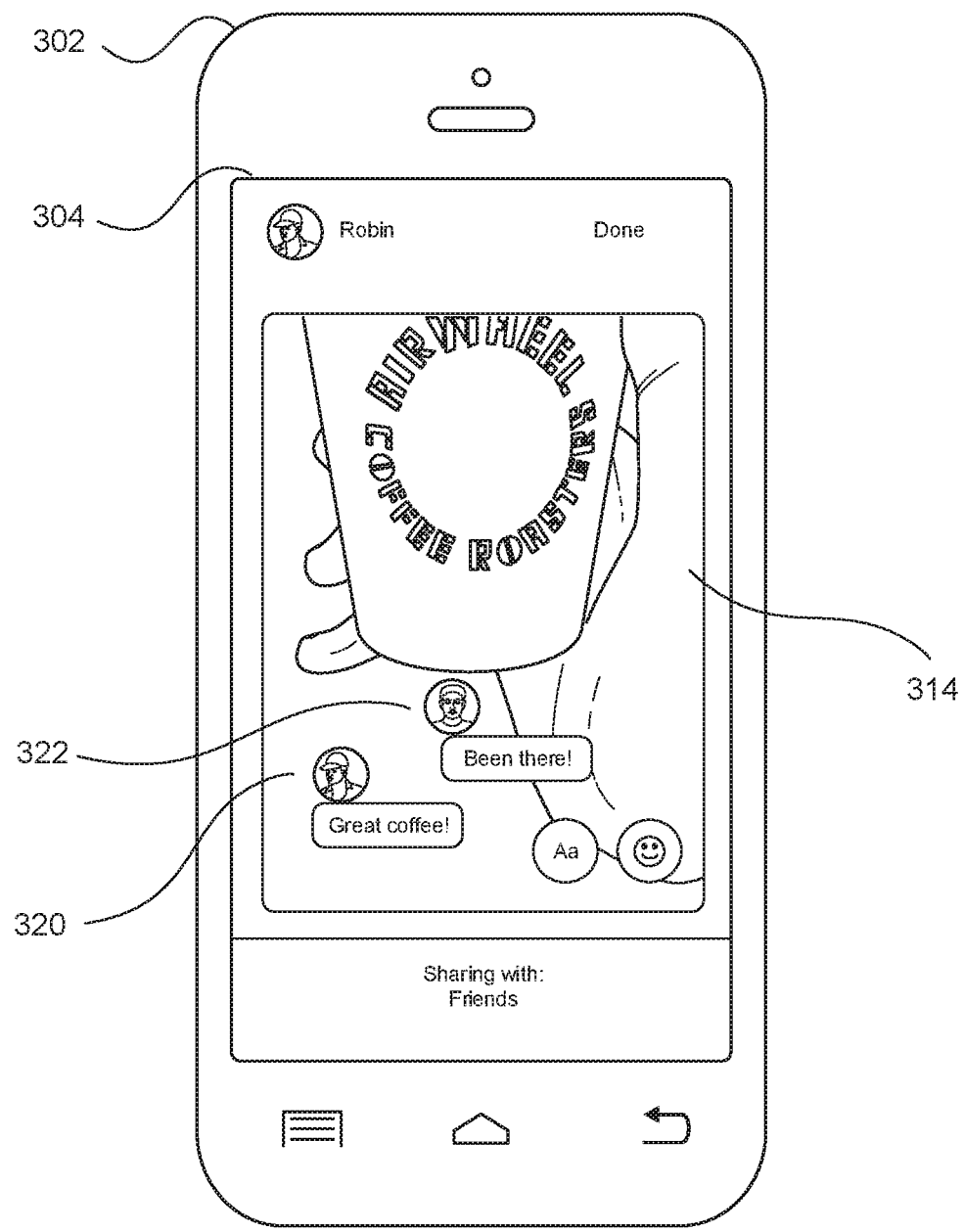

FIG. 3A illustrates an example composer interface 304, according to an embodiment of the present disclosure. In this example, the interface 304 is presented through a display screen of a computing device 302 that is configured to interact with a social networking system (e.g., social networking system 630 of FIG. 6). Further, the interface 304 may be provided through an application (e.g., a web browser, a social networking application, etc.) running on the computing device 302. The interface 304 includes options for creating and sharing collaborative posts. For example, the interface 304 includes an option 306 for creating cards to be included in a collaborative post. As mentioned, in some embodiments, users can contribute to a collaborative post by creating cards that are published with the collaborative post. The interface 304 also includes an option 308 for adding users as collaborators that can contribute to the collaborative post. For example, the user operating the computing device 302 can select the option 308 to identify (or tag) collaborating users as illustrated in the example of FIG. 3B. As shown in FIG. 3B, the user can search for users to add as collaborators using a search field 310. In some embodiments, a list of potential collaborators 312 can be suggested to the user. In this example, a first collaborating user "Christophe" and a second collaborating user "Page" have been tagged. Once collaborators are identified, the user operating the computing device 302 and the tagged collaborators can add content to the collaborative post. For example, as shown in FIG. 3C, the user operating the computing device 302 can select an option (or perform a gesture) to add a card 314 to the collaborative post. As mentioned, the card 314 can include text, visual media, audio content, or a combination thereof. In the example of FIG. 3D, the user has selected an image 316 to include in the card 314. The image 316 is then shown within the card 314, as illustrated in the example of FIG. 3E. The user can also edit the card 314 using options 318. For example, the options 318 can be selected to add text and other visual content (e.g., annotations, stickers) to the card 314. In FIG. 3E, the user has added an annotation 320 ("Great coffee!") to the card 314. In some embodiments, as shown, an annotation can include text and an avatar representing a user that created the annotation. In various embodiments, the card 314 can similarly be edited by the tagged collaborators. For example, FIG. 3F illustrates an annotation 322 ("Been there!") that was added to the card 314 by a collaborating user. When ready for publication, the user operating the computing device 302 can select an option to publish the collaborating post along with the card 314 to the social networking system. As mentioned, the tagged collaborators can continue adding their own cards and edits to the collaborative post even after its publication.

Figure 4A:
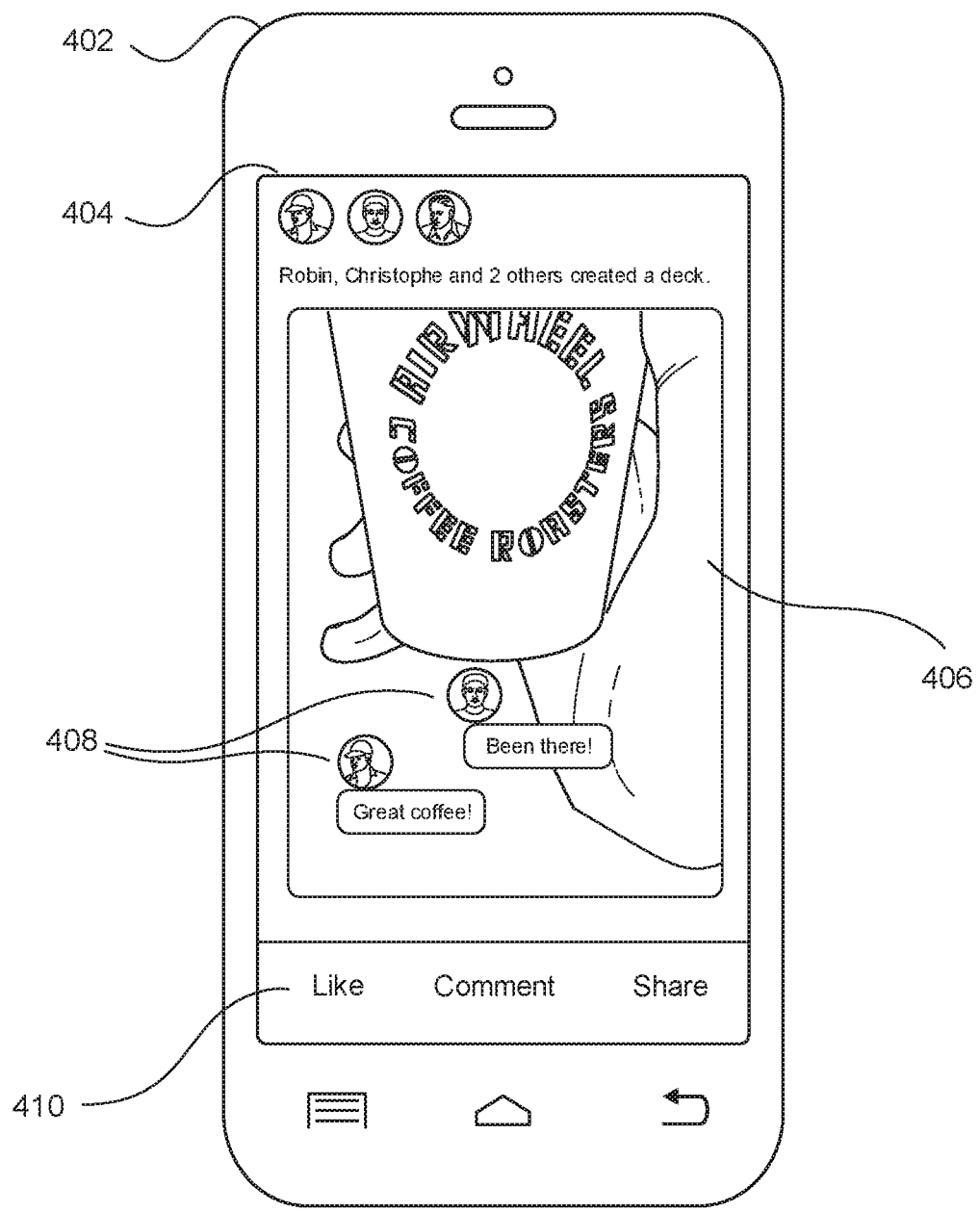
FIGS. 4A-4B illustrate another example interface, according to an embodiment of the present disclosure.
Figure 4B:
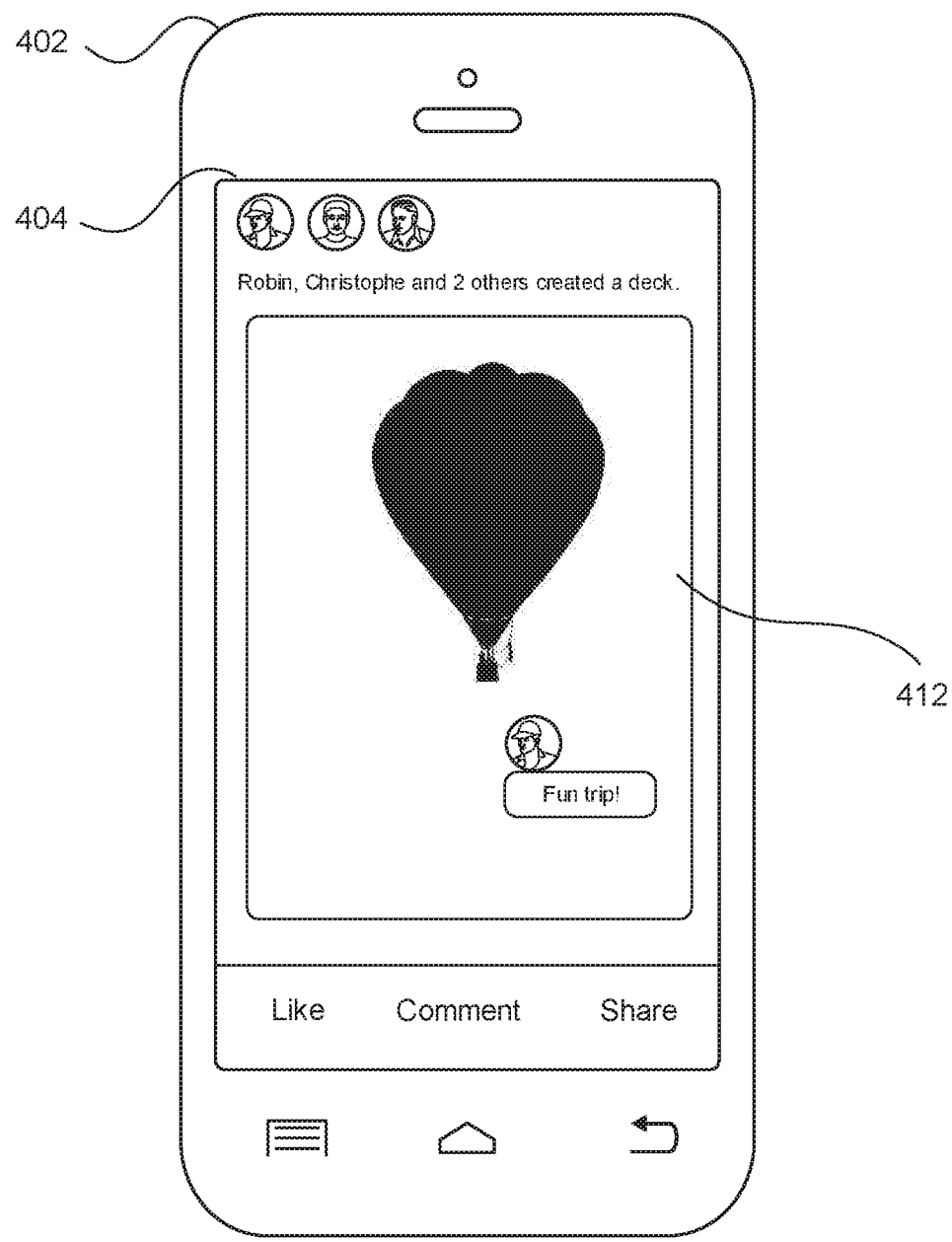

FIG. 4A illustrates an example interface 404, according to an embodiment of the present disclosure. In this example, the interface 404 is presented through a display screen of a computing device 402 that is configured to interact with a social networking system. Further, the interface 404 may be provided through an application (e.g., a web browser, a social networking application, etc.) running on the computing device 402. In the example of FIG. 4A, the interface 404 is being used to access a first card 406 of a collaborative post. In this example, the first card 406 includes visual content and annotations 408 added by collaborating users. A user operating the computing device 402 can select options 410 (e.g., like, comment, share) to interact with the collaborative post. In various embodiments, the user can access additional cards included in the collaborative post as illustrated in the example of FIG. 4B. For example, the user can select an option (or perform a gesture) to access another card 412 that was added to the collaborative post by a different collaborating user.

Figure 5:
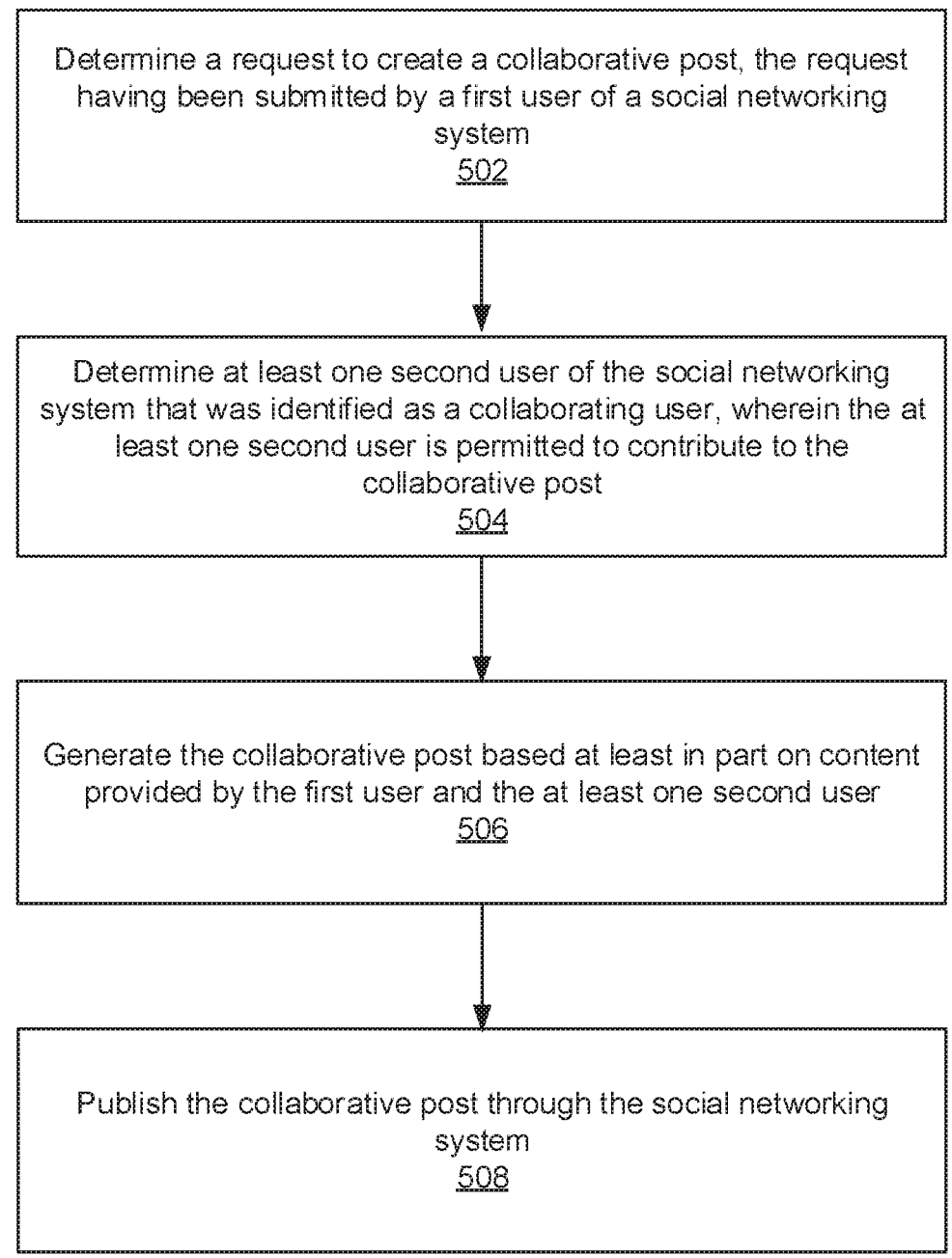
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a request to create a collaborative post can be determined, the request having been submitted by a first user of a social networking system. At block 504, at least one second user of the social networking system that was identified as a collaborating user can be determined. The at least one second user is permitted to contribute to the collaborative post. At block 506, the collaborative post can be generated based at least in part on content provided by the first user and the at least one second user. At block 508, the collaborative post can be published through the social networking system.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
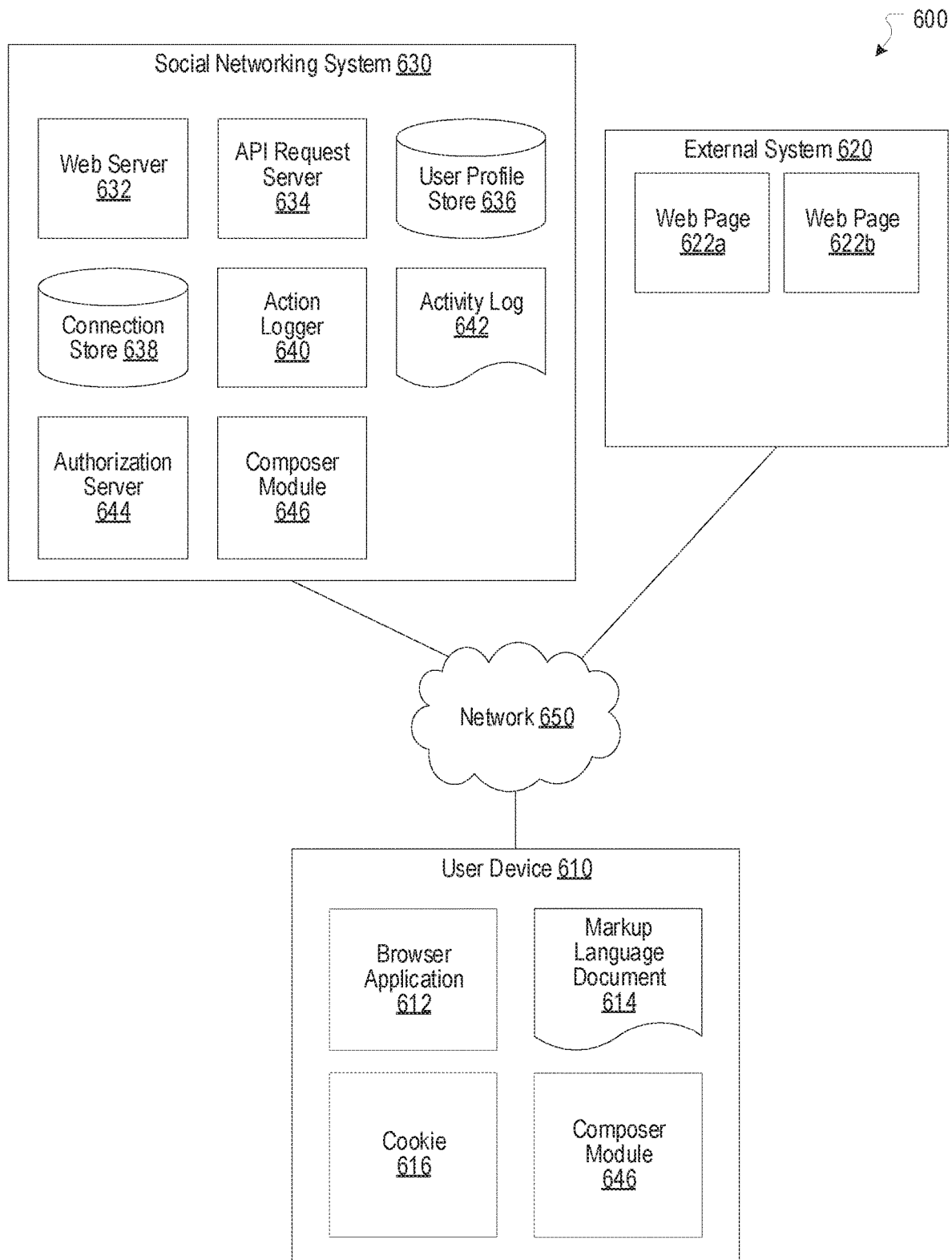
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a composer module 646. The composer module 646 can, for example, be implemented as the composer module 102 of FIG. 1. In some embodiments, the composer module 646, in whole or in part, is additionally or alternatively implemented in the user device 610. As discussed previously, it should be appreciated that there can be many variations or other possibilities.

Hardware Implementation

Figure 7:
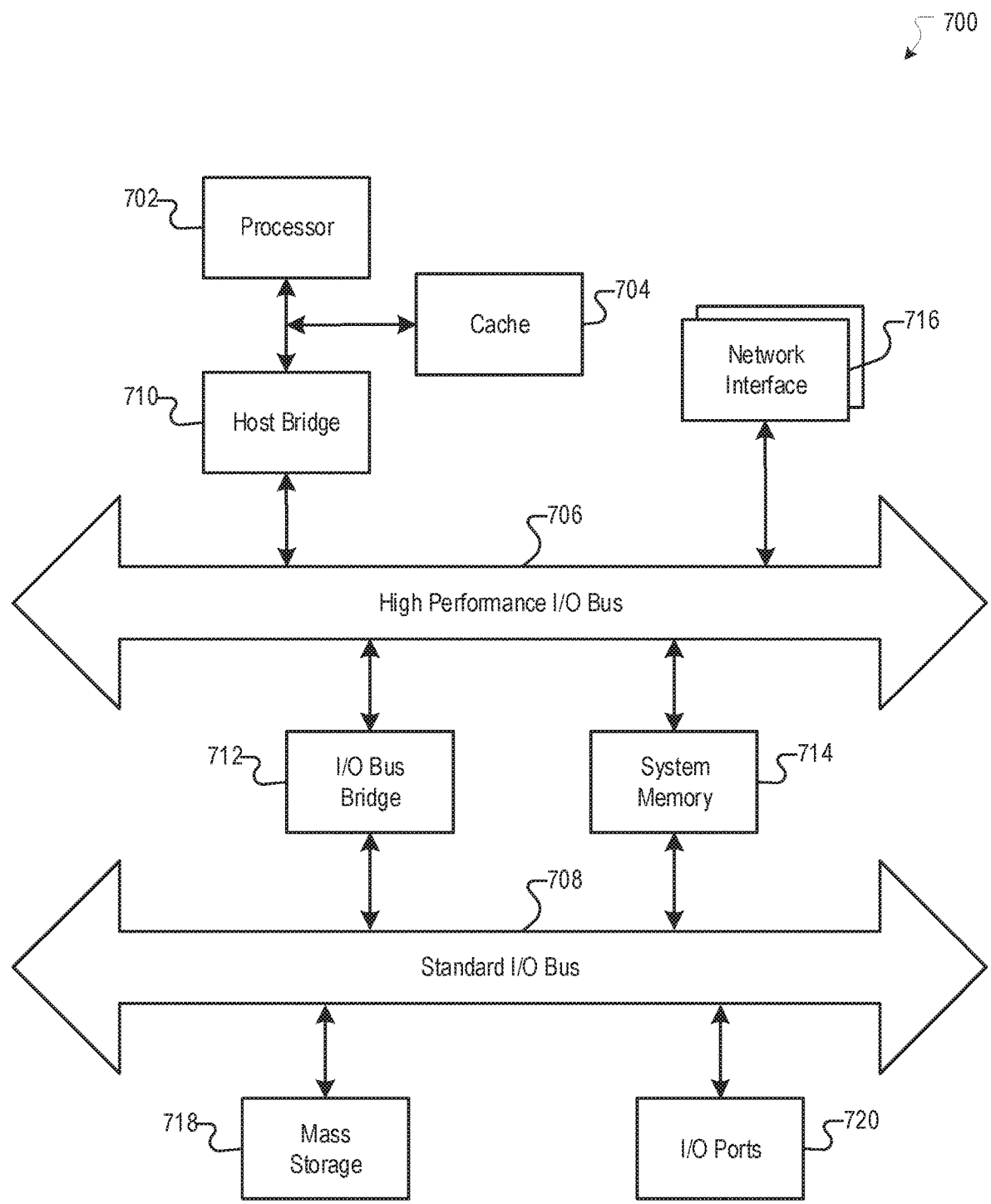
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a request to create a collaborative post, the request submitted by a first user of a system;
   providing, by the computing system, a list of suggested collaborators for the collaborative post, the list of suggested collaborators including at least one second user of the system;
   determining, by the computing system, the at least one second user of the system was identified as a collaborator from the list of suggested collaborators, wherein the at least one second user is permitted to contribute to the collaborative post;
   generating, by the computing system, the collaborative post based at least in part on content provided by the first user, wherein the collaborative post includes at least a first card created by the first user;
   providing, by the computing system, the collaborative post with at least the first card in a content feed through the system; and
   after providing the collaborative post with the first card created by the first user in the content feed, updating, by the computing system, the collaborative post to include a second card created by the at least one second user, wherein the updated collaborative post with the first card and the second card is provided in the content feed.

2. The computer-implemented method of claim 1, wherein each card includes text, visual content, audio content, or a combination thereof.

3. The computer-implemented method of claim 1, wherein generating the collaborative post comprises:
   determining, by the computing system, the first card that was created by the first user for publication with the collaborative post; and
   associating, by the computing system, the first card with the collaborative post.

4. The computer-implemented method of claim 3, further comprising:
   determining, by the computing system, one or more edits made to the first card by the at least one second user; and
   applying, by the computing system, the one or more edits to the first card, wherein the one or more edits are reflected in the published collaborative post.

5. The computer-implemented method of claim 1, wherein generating the collaborative post comprises:
   determining, by the computing system, at least one third card that was created by the at least one second user for publication with the collaborative post; and
   associating, by the computing system, the at least one third card with the collaborative post.

6. The computer-implemented method of claim 5, further comprising:
   determining, by the computing system, that the at least one third card was submitted after publication of the collaborative post; and
   updating, by the computing system, the published collaborative post to include the at least one third card.

7. The computer-implemented method of claim 1, wherein the at least one second user is permitted to add content to the collaborative post even after the collaborative post is published to the system.

8. A system comprising:
   at least one processor; and
   a memory storing instructions that, when executed by the at least one processor, cause the system to perform:
   determining a request to create a collaborative post, the request submitted by a first user of a system;
   providing a list of suggested collaborators for the collaborative post, the list of suggested collaborators including at least one second user of the system;
   determining the at least one second user of the system was identified as a collaborator from the list of suggested collaborators, wherein the at least one second user is permitted to contribute to the collaborative post;
   generating the collaborative post based at least in part on content provided by the first user, wherein the collaborative post includes at least a first card created by the first user;
   providing the collaborative post with at least the first card in a content feed through the system; and
   after providing the collaborative post with the first card created by the first user in the content feed, updating the collaborative post to include a second card created by the at least one second user, wherein the updated collaborative post with the first card and the second card is provided in the content feed.

9. The system of claim 8, wherein each card includes text, visual content, or a combination thereof.

10. The system of claim 8, wherein generating the collaborative post causes the system to perform:
   determining the first card that was created by the first user for publication with the collaborative post; and
   associating the first card with the collaborative post.

11. The system of claim 10, wherein the instructions further cause the system to perform:
   determining one or more edits made to the first card by the at least one second user; and
   applying the one or more edits to the first card, wherein the one or more edits are reflected in the published collaborative post.

12. The system of claim 8, wherein generating the collaborative post comprises:
   determining at least one third card that was created by the at least one second user for publication with the collaborative post; and
   associating the at least one third card with the collaborative post.

13. The system of claim 12, wherein the instructions further cause the system to perform:
   determining that the at least one third card was submitted after publication of the collaborative post; and
   updating the published collaborative post to include the at least one third card.

14. The system of claim 8, wherein the at least one second user is permitted to add content to the collaborative post even after the collaborative post is published to the system.

15. A non-transitory computer-readable storage medium including instructions that, when executed by at least one processor of a computing system, cause the computing system to perform a method comprising:
   determining a request to create a collaborative post, the request submitted by a first user of a system;
   providing a list of suggested collaborators for the collaborative post, the list of suggested collaborators including at least one second user of the system;
   determining the at least one second user of the system was identified as a collaborator from the list of suggested collaborators, wherein the at least one second user is permitted to contribute to the collaborative post;
   generating the collaborative post based at least in part on content provided by the first user, wherein the collaborative post includes at least a first card created by the first user;
   providing the collaborative post with at least the first card in a content feed through the system; and
   after providing the collaborative post with the first card created by the first user in the content feed, updating the collaborative post to include a second card created by the at least one second user, wherein the updated collaborative post with the first card and the second card is provided in the content feed.

16. The non-transitory computer-readable storage medium of claim 15, wherein each card includes text, visual content, or a combination thereof.

17. The non-transitory computer-readable storage medium of claim 15, wherein generating the collaborative post causes the computing system to perform:
   determining the first card that was created by the first user for publication with the collaborative post; and
   associating the first card with the collaborative post.

18. The non-transitory computer-readable storage medium of claim 17, wherein the instructions further cause the computing system to perform:
   determining one or more edits made to the first card by the at least one second user; and
   applying the one or more edits to the first card, wherein the one or more edits are reflected in the published collaborative post.

19. The non-transitory computer-readable storage medium of claim 15, wherein generating the collaborative post comprises:
   determining at least one third card that was created by the at least one second user for publication with the collaborative post; and
   associating the at least one third card with the collaborative post.

20. The non-transitory computer-readable storage medium of claim 19, wherein the instructions further cause the computing system to perform:
   determining that the at least one third card was submitted after publication of the collaborative post; and
   updating the published collaborative post to include the at least one third card.

* * * * *